March 13, 1951
L. F. GELBMAN
2,544,752
PROCESS FOR MAKING LIGHTWEIGHT AGGREGATES
USING FRAGILE NODULES
Filed June 10, 1949
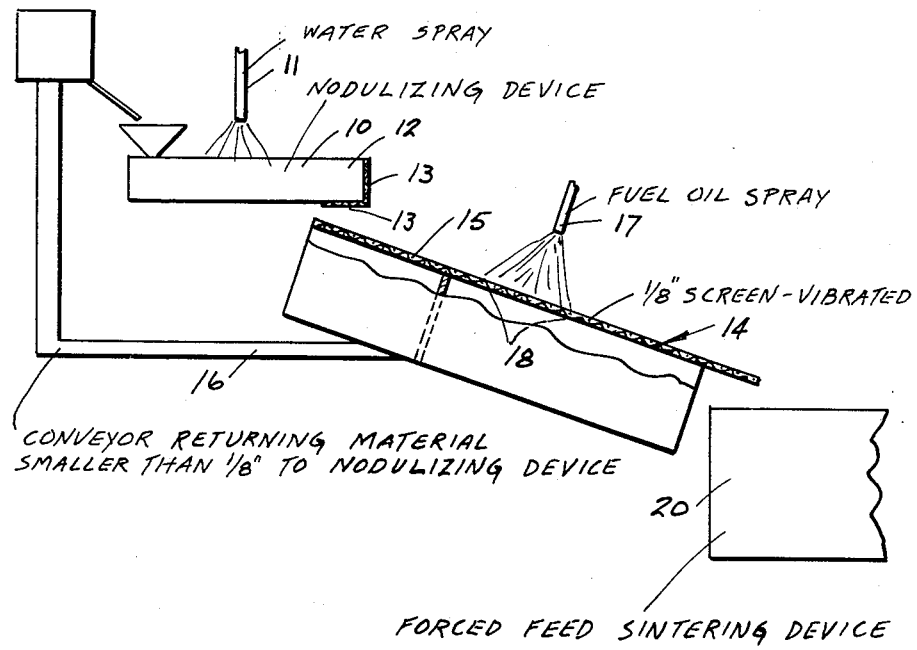
INVENTOR
LAWRENCE F. GELBMAN
BY
ATTORNEY Patented Mar. 13, 1951

2,544,752

UNITED STATES PATENT OFFICE 2,544,752

PROCESS FOR MAKING LIGHTWEIGHT AGGREGATES USING FRAGILE NODULES

Lawrence F. Gelbman, Yonkers, N. Y.

Application June 10, 1949, Serial No. 98,186

5 Claims. (Cl. 25—156)

This invention relates to new and useful improvements in processes for making lightweight aggregate for concrete, and has more particular reference to a process making use of fragile nodules.

In the past great difficulty was experienced in making lightweight aggregate for use in concrete by the sintering process using a forced draft when very fine sinterable aggregate body material was used. These fine materials of 100 screen, and smaller, such as fly ash, clay, etc., have a tendency of blocking the air passages so that the sintering mass burns down a short distance and then the flame goes out. To avoid this condition it has been a practice to add coarser material to the fine material so as to provide air passages. Various systems were devised for filling the sintering chambers with different layers of material of different coarseness. However, in all prior methods the operation was highly unreliable, depending upon chance. If the fine material accidentally assumed certain positions the passages were totally blocked and the flame would go out.

By way of illustration, attention is called to the patent of Louis Gelbman, No. 2,414,734, calling for a lightweight aggregate process making use of fly ash, slag and return fines. While this process has given fair results, at times the fly ash would assume such positions as to block the air passages with resultant extinguishing of the sintering flame. Experiments have proved that with even as little as 5% fly ash this material could assume such a position as to interfere with the sintering process. Another objection to this process and other similar processes, is the time element required for the sintering operation. Even if the air passages are not completely blocked, they may be blocked to such an extent that the burning progresses slowly and a relatively long time is required, ranging from ten to twenty minutes.

After extensive experimentation I have discovered that superior results may be obtained in the sintering process if nodules of fine materials of uniform size are used, ranging in size from ⅛" to about ½". By using this type of material the sintering time is materially reduced for the simple reason that the air spaces are increased and are uniform. Moreover, a superior lightweight aggregate is produced having a superior physical structure.

I have known of numerous attempts in the past to use fly ash exclusively as the sinterable aggregate body material but such attempts have never been successful. I have discovered that this material may be used by itself without requiring the addition of slag or return fines, or other pellets or materials, provided the fly ash was formed into nodules. I have discovered a simple way to produce these nodules. In my process the nodules are quite fragile, but they have sufficient strength to withstand disintegration during the handling they receive in the sintering process.

Another object of the invention is the employing of a method as described which is simple, and which may be carried out at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure, the figure is a schematic showing of my new process.

The process for making lightweight aggregate using fragile nodules, in accordance with one form of this invention, includes subjecting fine sinterable aggregate body material containing the fuel needed for sintering to the action of a continuous nodulizing device 10, such as a rotary mixer or vibrating screen, and introducing water with a spray 11 into said device 10 to form and bond said fine material into fragile nodules. The discharge end 12 of the device 10 is provided with ½" screen material 13 through which the nodules may discharge. The discharging nodules are then screened to remove material smaller than ⅛". This is done with a ⅛" vibrating screen 14 positioned beneath ½" discharge of the device 10. The nodules of material of smaller size than ⅛" pass through the front portion 15 of the screen 14 and are returned by a conveyor 16 to the continuous nodulizing device 10 to be reformed into nodules of the proper size.

At the central portion of the vibrating screen 14 the nodules are strengthened by a spray 17, preferably discharging fuel oil or a saline solution. This spray 17 is confined to a central area 18 of the vibrating screen 14 which is past the front portion 15 in which the material is returned to the device 10. The purpose of this arrangement is to avoid the fuel oil from reaching the material being returned to the device 10 because merely surface spraying of the nodules is desired. It is pointed out that experiments have shown the inadvisability of allowing fuel oil sprayed nodules to be returned to the device 10 as the fuel oil will then be mixed throughout the entire body of the nodules.

Because the screen 14 vibrates, the fuel oil or saline solution will be discharged on most of the surfaces of the nodules passing through the spray area 18. The nodules from the vibrating screen 14 are then discharged into a forced feed sintering apparatus 20 of the type shown in the patent to Louis Gelbman, supra. It is absolutely essential to this process that the sintering device 20 be of the forced feed stationary type, that is the type in which the nodules rest upon a stationary grate. The nodules are quite fragile and would be broken up in a rotary type kiln. This process is therefore limited to the stationary forced feed type of sintering device. Experiments have shown that if the fuel oil is saturated in the nodules the smoke discharged during the sintering steps will be excessive and highly objectionable.

Various fine sinterable aggregate body material may be used in this process. Materials screening as fine as 100 to 200 mesh, or finer, may be used. Heretofore, these materials could not be used by themselves without the addition of larger materials to produce porosity. The fine materials capable of use in this process are fly ash, clay, etc. When fly ash is used no additional fuel need be added since it contains sufficient fuel for supporting combustion in the sintering step. When clay is used or materials lacking fuel, it is necessary that granulated solid fuel, such as coal or the like, be added to provide the necessary fuel to carry out the combustion of the sintering process. For example, 6 to 8% of solid fuel added to clay would be sufficient. When fuel oil is used to strengthen the fragile nodules it is advisable that its use be limited to about one quart fuel oil to each yard of nodules.

It should be particularly noted that the nodules are formed merely by the addition of water, which subsequently evaporates and therefore no foreign materials were added to the sinterable aggregate body material. The only foreign materials required in this process are the coating material, such as the fuel oil or saline solution to strengthen the fragile nodules sufficiently so that they do not disintegrate while being sintered. The nodules, when sintered, burn individually and do not agglomerate. Therefore the sintered product usually comprises the individual pellets formed by the nodules, or a cake which may be easily broken up into the nodule pellets.

While I have illustrated and described the preferred embodiments of my invention, it is to be understood that I do not limit myself to the precise construction herein disclosed and the right is reserved to all changes coming within the scope of the invention as defined in the appended claims.

Having thus described my invention, what I claim as new and desire to secure by United States Letters Patent is:

1. In a process for making lightweight aggregate using fragile nodules, the steps of subjecting fine sinterable aggregate body material containing fuel needed for combustion in sintering to the action of a nodulizing device and introducing a water spray into said nodulizing device to form and bond said fine material into fragile nodules, screening said fragile nodules to sizes ranging from ⅛" to ½", and sintering said nodules with a stationary forced draft sintering system.

2. In a process for making lightweight aggregate using fragile nodules, the steps of subjecting fine sinterable aggregate body material containing fuel needed for combustion in sintering to the action of a nodulizing device and introducing a water spray into said nodulizing device to form and bond said fine material into fragile nodules, screening said fragile nodules to sizes ranging from ⅛" to ½", strengthening said fragile nodules by surface spraying with coating material, and sintering said strengthened nodules with a stationary forced draft sintering system.

3. In a process for making lightweight aggregate using fly ash fragile nodule, the steps of subjecting fly ash to the action of a nodulizing device and introducing a water spray into said device to form and bond said fly ash into fragile nodules, screening said fragile nodules to sizes ranging from ⅛" to ½", spraying the surfaces of said screened nodules with a coating material for strengthening said fragile nodules, and sintering said strengthened nodules with a stationary forced draft sintering system.

4. In a process for making lightweight aggregate using fly ash fragile nodule, the steps of subjecting fly ash to the action of a nodulizing device and introducing a water spray into said device to form and bond said fly ash into fragile nodules, screening said fragile nodules to sizes ranging from ⅛" to ½", spraying the surfaces of said screened nodules with a coating material for strengthening said fragile nodules, and sintering said strengthened nodules with a stationary forced draft sintering system, said screening being carried out with a vibrating screen, and said spraying being carried out on a portion of said vibrating screen in order that various sides of said nodules will be sprayed, and one quart of fuel oil being sprayed upon each yard of said fragile nodules.

5. In a process for making lightweight aggregate using clay fragile nodules, the steps of adding granulated solid fuel to clay in order to provide the necessary fuel to sinter said clay, subjecting said sinterable material of clay and fuel to the action of a nodulizing device and introducing a water spray into said nodulizing device to form and bond said clay and fuel into fragile nodules, screening said fragile nodules to sizes ranging from ⅛" to ½", spraying the surfaces of said screened nodules with a coating substance for strengthening said fragile nodules, and sintering said strengthened nodules with a stationary forced draft sintering system.

LAWRENCE F. GELBMAN.

REFERENCES CITED

The following references are of record in the file of this patent:

UNITED STATES PATENTS

| Number | Name | Date |
| --- | --- | --- |
| 2,035,845 | Stanton | Mar. 31, 1936 |
| 2,414,734 | Gelbman | Jan. 21, 1947 |
| 2,478,757 | Foster | Aug. 9, 1949 |